United States Patent
Damen et al.

(10) Patent No.: US 8,534,451 B2
(45) Date of Patent: Sep. 17, 2013

(54) CONVEYING APPARATUS

(75) Inventors: Franciscus Antonius Damen, Langeweg (NL); Johannes Van Veen, Poederoijen (NL); Hendrik Bol, Raamsdonkveer (NL); Johannes Wilhelmus Adrianus Van Heijst, Kaatsheuvel (NL)

(73) Assignee: IMA Life S.R.L., Ozzano Dell'Emilia (IT)

( * ) Notice: Subject to any disclaimer, the term of this patent is extended or adjusted under 35 U.S.C. 154(b) by 533 days.

(21) Appl. No.: 12/739,722

(22) PCT Filed: Oct. 23, 2008

(86) PCT No.: PCT/EP2008/064366
§ 371 (c)(1),
(2), (4) Date: Oct. 20, 2010

(87) PCT Pub. No.: WO2009/053433
PCT Pub. Date: Apr. 30, 2009

(65) Prior Publication Data
US 2011/0048893 A1 Mar. 3, 2011

(30) Foreign Application Priority Data
Oct. 23, 2007 (EP) .................................. 07075923

(51) Int. Cl.
*B65G 47/68* (2006.01)
(52) U.S. Cl.
USPC ......... 198/442; 198/347.4; 198/367; 198/427
(58) Field of Classification Search
USPC .............. 198/347.4, 367, 427, 442, 598, 623
See application file for complete search history.

(56) References Cited

U.S. PATENT DOCUMENTS

| | | | | |
|---|---|---|---|---|
| 3,342,303 A | * | 9/1967 | Onulak | 198/419.1 |
| 3,986,596 A | * | 10/1976 | Hamilton | 198/890.1 |
| 4,142,636 A | * | 3/1979 | Planke | 209/524 |
| 4,462,516 A | * | 7/1984 | Guerzoni | 198/427 |
| 5,988,356 A | * | 11/1999 | Bonnet | 198/598 |
| 6,328,151 B1 | * | 12/2001 | Spangenberg et al. | 198/347.4 |
| 6,612,425 B1 | * | 9/2003 | Garvey | 198/839 |
| 6,959,802 B1 | * | 11/2005 | Garvey | 198/347.1 |

(Continued)

FOREIGN PATENT DOCUMENTS

| | | |
|---|---|---|
| DE | 3642764 A1 | 3/1988 |
| DE | 10015566 A1 | 10/2001 |
| EP | 0364894 A | 4/1990 |
| EP | 0391208 A | 10/1990 |
| EP | 1619459 A | 1/2006 |
| FR | 2581374 A | 11/1986 |
| GB | 2256844 A | 12/1992 |
| NL | 8700974 A | 11/1987 |
| NL | 9300212 A | 9/1994 |

*Primary Examiner* — Douglas Hess
(74) *Attorney, Agent, or Firm* — Knobbe, Martens, Olson & Bear, LLP (57) ABSTRACT

The invention relates to a conveying system for conveying intended upright articles, for example vials, comprising an in-feed conveyor, an out-feed conveyor, and a single liner system placed between said in-feed conveyor and out-feed conveyor, wherein said single liner system comprising a series of co-planar conveyor belts, wherein said belts are placed side by side for defining a conveying surface and wherein said belts are movable in substantially the same driving direction at different velocities; a track guide placed above said conveying surface for guiding said articles from said in-feed conveyor to said out-feed conveyor along a guide direction, wherein said guide direction is arranged at an acute angle with respect to said driving direction; wherein said velocity of subsequent belts of said series of co-planar conveyor belts increases in the guide direction.

28 Claims, 5 Drawing Sheets

(56) References Cited

U.S. PATENT DOCUMENTS

| | | | |
|---|---|---|---|
| 7,165,667 B2 * | 1/2007 | Bocker et al. | 198/442 |
| 7,222,718 B2 * | 5/2007 | Tarlton | 198/445 |
| 7,322,459 B2 * | 1/2008 | Garvey | 198/461.1 |
| 8,132,661 B2 * | 3/2012 | Van Schaijk et al. | 198/370.09 |
| 8,196,733 B2 * | 6/2012 | Hahn | 198/367 |

* cited by examiner

CONVEYING APPARATUS

This application is U.S. National Phase of International Application No. PCT/EP2008/064366, filed Oct. 23, 2008 designating the U.S., and published in English as WO 2009/053433 on Apr. 30, 2009, which claims priority to European Patent Applications No. 07075923.8, filed Oct. 23, 2007.

BACKGROUND

The invention relates to a conveying system for conveying articles, in particular a single liner system for receiving a multi-row stream of intended upright articles, such as sterilized containers or vials from a freeze dryer or a sterilization tunnel, and arranging said articles in a single row for feeding on to a conveyor.

Freeze dryers or sterilization tunnels, typically incorporate a chamber for receiving a plurality of containers or vials. It is common practice in such circumstances to arrange the vials in a hexagonal pattern to make optimal use of the available surface area. The vials are typically removed from said chamber by using an unloading mechanism, which moves the of sterilized vials back on to a conveyor, usually in a multi-row stream, for subsequent transfer to a filling machine in the case of a sterilizing tunnel or capping machine or the like for sealing the sterilized vials in the case of a freeze dryer. Capping machines generally require the vials to be conveyed there through in a single row, and so it is necessary to convert the multi-row stream of vials received from the freeze dryer or sterilization tunnel, into a single row prior to arrival at the capping machines or the like.

It is known to provide a funneling arrangement that receives the vials from the conveyor and channels the vials into a single row. The vials are moved through the funneling arrangement by virtue of the forces exerted from behind by vials being conveyed into the funneling arrangement by the conveyor.

Vials tend to exhibit strong sticking and friction effects when pressed against other vials and this can prevent a smooth transition into a single row of vials. Whilst a vibrating plate could assist in the separation of individual vials within the funneling arrangement, such plates tend to require complicated set-up and tuning procedures. Furthermore, this solution can lead to scratching of the vials as they are brought into contact with one another (as glass vials tend to be extremely abrasive) and the generation of particulates and sometimes even vial breakage.

It is further known to provide a single liner system comprising a rotating surface. Said conveying system further comprises a conveyor means for conveying upright articles towards a transfer device for transferring articles from the conveyor means to the rotating surface. The transfer device comprises a guide surface moving at a substantially constant speed towards the rotating surface and extending obliquely over the conveyor means and the rotating surface. Furthermore said conveying system comprises a curved guide surface for guiding articles transferred to the rotating surface towards the outer periphery thereof for subsequent removal there from. The curved guide surface serves to separate out the articles as they are conveyed by the rotating surface. Such a conveying apparatus is published in the International patent application WO 2006/043020.

A disadvantage of such a system is that it contains multiple rotating devices that have to be tuned carefully. Furthermore the rotating surface has a large diameter which requires a large floor space, and is not easily integrated into a production line.

It is an aim of at least the preferred embodiment of the present invention to provide a conveying system that can convert a multi-row stream of articles, such as vials, into a single row whilst minimizing the risks of blockage, in particular due to the presence of loose stoppers and other impediments, fallen vials and vial damage, and at least reduces the size or footprint of the system. This is most desirable in case of the application of barrier isolators.

SUMMARY OF THE INVENTION

In a first aspect, the present invention provides a conveying system comprising an in-feed conveyor, an out-feed conveyor, and a single liner system placed between said in-feed conveyor and out-feed conveyor, wherein said single liner system comprising a series of co-planar conveyor belts, wherein said belts are placed side-by-side for defining a conveying surface and wherein said belts are movable in substantially the same driving direction at different velocities; a track guide placed above said conveying surface for guiding said articles from said in-feed conveyor to said out-feed conveyor along a guide direction wherein said guide direction is arranged at an acute angle with respect to said driving direction; and wherein said velocity of subsequent belts of said series of co-planar conveyor belts increases in the guide direction.

The single liner system serves to separate out the articles as they are conveyed over the series of co-planar conveyor belts. The track guide guides the articles towards the successive conveyor belts, wherein said velocity of subsequent belts increases in the guide direction. Since the velocity of the subsequent belts increases in downstream direction, the spacing between the articles will increase. Furthermore, since the articles are pushed by the conveyor belts towards said track guide, the articles are urged into a single row formation.

The unloading mechanism used to remove the vials from the chamber, such as from a freeze dryer or sterilizing tunnel, preferably is synchronized with the in-feed conveyor in such a way that a maximum throughput of the system is achieved. This is done by adapting the speed of the pusher, so that vials enter the in-feed conveyor in an ordered manner, preferably in multiple orderly rows of vials, preferably less than five rows of vials and ideally two or three rows of vials.

Pharmaceutical containers such as vials and ampoules tend to have relatively high height to diameter ratios, which makes them susceptible to toppling as they are conveyed through a conveying system. In an embodiment the conveying system comprises a track guide which extends at least partially over said in-feed conveyor, the same track guide can be used for guiding said articles from the surface of said in-feed conveyor towards said single liner system while maintaining the stabilizing functionality. The conveying system according this embodiment, provides a gentle guiding of said articles, because there is no physical transition means from a first guiding means towards said track guide since these physical transitions cause discontinuities in the flow of vials. This can reduce greatly the likelihood of the vials toppling as they are transferred from said in-feed conveyor to said series of co-planar conveyor belts.

The same advantage can also be obtained at the downstream end of said track guide by an embodiment wherein said downstream end of said track guide extends at least partially over said out-feed conveyor.

To further increase the smooth transition from the in-feed conveyor to the series of co-planar conveyor belts, in an embodiment a first belt of the series of conveyor belts that is adjacent to said in-feed conveyor is co-planar with said in-feed conveyor. In an embodiment said end part of said in-feed conveyor and said first belt are placed side-by-side. In an embodiment the velocity of said first belt is substantially equal to the velocity of said in-feed conveyor.

In a further embodiment, the velocity of said first belt is higher than the velocity of said in-feed conveyor. In this embodiment the transition from the in-feed conveyor to the first belt can already be used to start increasing the spacing between the articles for allowing them to adopt a single row formation.

Furthermore in order to provide a smooth transition from said series of conveyor belts to said out-feed conveyor, in an embodiment the last belt of the series of conveyor belts that is adjacent to said out-feed conveyor is co-planar with said out-feed conveyor. In an embodiment an onset-part of said out-feed conveyor and said last belt are placed side-by-side. In an embodiment the velocity of said out-feed conveyor is equal to the velocity of said last belt. This provides a smooth transition between the last belt and the out-feed conveyor.

In a further embodiment the velocity of said out-feed conveyor is higher than the velocity of said last belt. In this case the transition from the last belt to the out-feed conveyor can be used to further increase the spacing between the articles for arranging a single row formation.

An additional or alternative measure for reducing the likelihood of the articles toppling as they are guided from said in-feed conveyor to said out-feed conveyor is to provide the track guide with a guiding surface that is substantially orthogonal to the conveying surface.

In an embodiment, the track guide comprises a guiding belt which provides said moving guide surface. By providing a moving guide surface for guiding the articles, the speed of these articles as they move along the guide direction can be accurately controlled. In an embodiment the velocity of said guiding belt is substantially equal to or higher than the velocity of said in-feed conveyor. In an embodiment the velocity of said guiding belt is substantially equal to said out-feed conveyor. Particularly in this last embodiment, there is no sudden change in acceleration as the articles leave said track guide on said out-feed conveyor. The moving guide surface furthermore prevents a piling up of the articles at the upstream end of the track guide.

A further additional or alternative measure for reducing the likelihood of the articles toppling as they are guided from said in-feed conveyor to said out-feed conveyor is to provide one or more of the conveyor belts with a conveying surface of a low friction material for admitting the surface to slide underneath said intended upright articles.

Although the above described embodiments can reduce greatly the likelihoods of the articles toppling as they are transferred to the out-feed conveyor, and thus can enable the articles to be conveyed through the system at a relatively high speed, in an embodiment, said out-feed conveyor and/or said track guide are arranged with respect to each other in order to prevent the conveyance of substantially any misaligned or non-upright articles. In order to enable any articles that have fallen or have been knocked out of aligned during conveyance to be rejected from the system, in an embodiment said out-feed conveyor and/or said track guide are arranged with respect to each other in order to expel any misaligned or non-upright articles.

In an embodiment the track guide comprises one or more apertures which are larger than the dimensions of fallen articles, in particular fallen vials, but smaller than the dimensions of the upright articles.

In an embodiment the track guide is place at a distance above the conveying surface of the series of co-planar conveyor belts, wherein an opening between an underside of the track guide an the conveying surface is larger than the dimensions of fallen articles, in particular fallen vials, but smaller than the dimensions of the upright articles.

As the row of articles pass along the conveying system and into contact with the track guide, the upright articles will continue to be guided by the track guide, whereas fallen articles will pass through the aperture and/or under the track guide and of the conveying system.

In an embodiment the track guide and the out-feed conveyor are arranged to provide an expel trajectory which runs over an edge of said out-feed conveyor, so that any such articles can fall from the out-feed conveyor.

In an embodiment said expel trajectory extends from said downstream end of said track guide and preferably substantially in line with said guide direction. In an embodiment, at least a part of said edge of said out-feed conveyor is provided without a side guide, allowing the removal of articles that have fallen or have been knocked out of alignment during conveyance.

In a further embodiment the downstream end of said track guide is arranged such that said articles exiting the said series of co-planar conveyor belts, move onto said out-feed conveyor near an edge of said out-feed conveyor. In this case any articles that have fallen or have been knocked out of alignment during conveyance will tumble over said edge and are thus rejected from the system.

In an embodiment the position of said downstream end of said track guide with respect to said out-feed conveyor is adjustable, in particular for adjusting said position of said downstream end with respect to said edge of said out-feed conveyor. In an embodiment said position of said downstream end of said track guide is adjustable by adjusting the acute angle between said guide direction and said driving direction. By arranging the downstream end of said track guide near an edge of said out-feed conveyor, wherein said edge of said out-feed conveyor is provided without a side guide, the out-feed conveyor will substantially convey only a single line of articles. Any articles not in said single line will tumble over said edge and are thus rejected from the system. In said embodiment with an adjustable position of the downstream end of said track guide with respect to said out-feed conveyor, the position of the articles on the out-feed conveyor can be adjusted and/or adapted with respect to the dimensions of the articles to be conveyed. In particular for arranging said single line of articles near a side section of said out-feed conveyor.

In a further embodiment said out-feed conveyor is sufficiently narrow for articles that have been fallen or have been knocked out of alignment easily, to fall of and do not remain on the conveyor in a misaligned or non-upright position. In an embodiment, the width of said out-feed conveyor is larger than the width of a bottom surface of said articles, and preferably is smaller than twice the width of said bottom surface or smaller than the height of said articles. Preferably this out-feed conveyor does not have side guides in order to prevent the conveyance of substantially any misaligned or non-upright articles.

Furthermore impediments, such as loose stoppers, may disturb the smooth transition from the multi-row to the single-row of articles. In an embodiment the conveying system comprises means to expel such impediments from the system. In an embodiment the track guide comprises one or more apertures which are larger than the dimensions of impediments, in particular loose stoppers, but smaller than the dimensions of the articles, in particular vials.

In an embodiment the track guide is place at a distance above the conveying surface of the series of co-planar conveyor belts, wherein an opening between an underside of the track guide an the conveying surface is larger than the dimensions of impediments, in particular loose stoppers, but smaller than the dimensions of the articles, in particular vials.

As the row of articles pass along the conveying system and into contact with the track guide, the articles will continue to be guided by the track guide, whereas impediments, in particular with a dimension smaller that the articles, will pass through the aperture and/or under the track guide of the conveying system.

In an embodiment the above mentioned means for expelling impediments and the above mentioned means for expelling fallen articles are combined and are placed at a distance to each other. In an embodiment the above mentioned means for expelling impediments are placed upstream with respect to the means for expelling fallen articles. The impediments and fallen articles are expelled on different locations along the process path of the conveying system, and thus provide distinguishable streams of expelled impediments and fallen articles.

In another embodiment, the conveying system comprises an in-feed track guide for guiding said articles onto said in-feed conveyor. In an embodiment, the in-feed track guide is adapted such that impediments, such as loose stopper, which may be present among the rows of articles can be removed from the conveying system. In this embodiment, impediments can been removed from the stream of articles prior to said stream of articles arriving at the single liner system. In order to expel impediments, the in-feed track guide may be provided with one or more apertures which are larger than the dimensions of impediments, in particular loose stoppers, but smaller than the dimensions of the articles, in particular vials. In addition or alternatively, the in-feed track guide may be place at a distance above the conveying surface of the series of co-planar conveyor belts, wherein an opening between an underside of the track guide an the conveying surface is larger than the dimensions of impediments, in particular loose stoppers, but smaller than the dimensions of the articles, in particular vials.

In an embodiment, the series of co-planar conveyor belts of said single liner system comprises at least two belts, preferably at least three belts.

In an embodiment, one or more of the conveyor belts comprises a non-even surface, in particular a rough surface or a surface with cavities or holes. Since the conveyor belt surfaces are pulled underneath said articles which are guided by the track guide, said uneven surface induces a wiggling movement of said articles. Said wiggling, on the one hand, may prevent and reduce the sticking and friction effects between said articles. On the other hand, it may support the movement of the articles into a single line.

In an embodiment, said system comprises a synchronizing system for synchronizing and/or timing a supply of articles to the in-feed conveyor with respect to the velocities of the conveyors of said conveying system, preferably with respect to the velocity of said in-feed conveyor. Such a synchronized system can be used to maximize the throughput of the flow of articles, in particular of vials, through the system. In an embodiment said synchronizing system is arranged to provide a synchronizing and/or timing signal for an unloading mechanism used to supply the articles to the conveying system.

The invention further relates to an assembly for processing a stream of intended upright articles, said assembly comprising a process chamber, in particular a freeze dryer or a sterilizing tunnel, comprising an unloading device to remove the articles from the chamber in a multi-row stream, wherein the assembly further comprises a conveying system as described above, for converting said multi-row stream of articles into a single-row stream. In an embodiment said unloading device is synchronized with the in-feed conveyor of the conveying system. In an embodiment said unloading device comprises pushing mechanism for pushing said articles out of said chamber, wherein the speed of said pushing mechanism is adapted to supply the articles to the in-feed conveyor in multiple rows, preferably less than five rows, more preferably two to three rows.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will now be described on the basis of an exemplary embodiment shown in the attached drawings, in which.

DETAILED DESCRIPTION OF THE INVENTION

Figure 1:
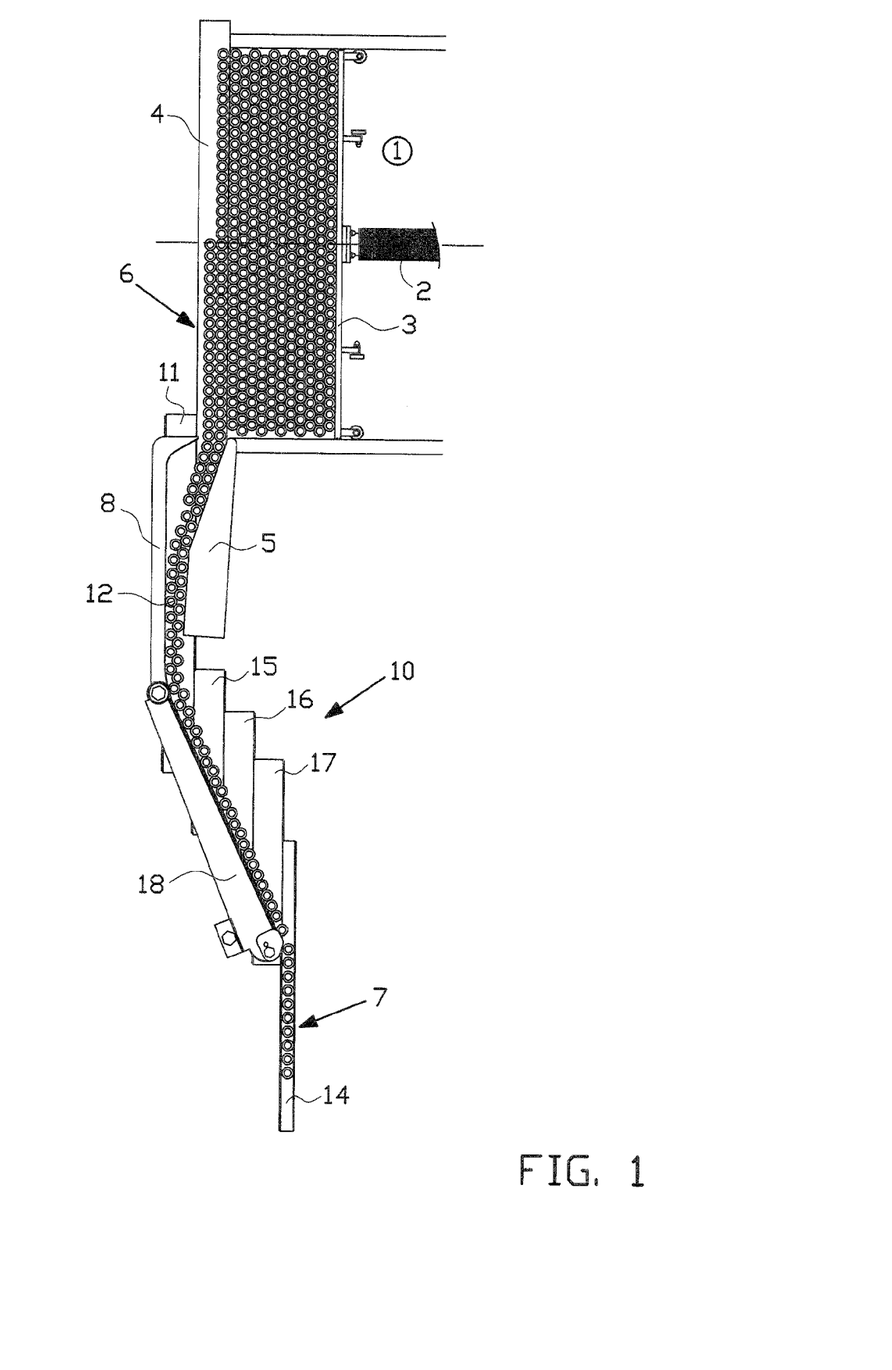
FIG. 1 illustrates a plan view of the total system including the elements to push the vials out of the chamber of, for example, a freeze dryer of a sterilizing tunnel.

FIG. 1 shows an assembly for processing a stream of intended upright vials 6, said assembly comprising a process chamber 1, in particular a freeze dryer or a sterilizing tunnel, comprising an unloading device 2, 3 to remove the vials 6 from the chamber 1 in a multi-row stream, wherein the assembly further comprises a conveying system 10 for converting said multi-row stream of vials 6 into a single-row stream 7. Said unloading device comprises pushing mechanism 2 for pushing said vials 6 out of said chamber 1, onto a conveyor 4 which supplies said vials 6 to the in-feed conveyor 11 in multiple rows.

The unloading mechanism used to remove the vials from the chamber 1, may be synchronized with the in-feed conveyor 11 in such a way that a maximum throughput of the system is achieved. This is done by adapting the speed of the pusher 2, so that vials 6 enter the in-feed conveyor 11 in an ordered manner.

The vials 6 are guided by an in-feed track guide 5, from said conveyor 4 to said in-feed conveyor 11. In order to prevent the vials 12 from toppling of the in-feed conveyor 11, said in-feed conveyor is provided with a side-rail 8.

Subsequently, the vials 6 are conveyed to a single liner system 10, comprising a series of co-planar conveyor belts 15, 16, 17 to create a gradual increase of the velocity of the vials. Above said conveyor belts 15, 16, 17, a track guide 18 is placed for guiding said vials from the in-feed conveyor 11 to an out-feed conveyor 14

Figure 2:
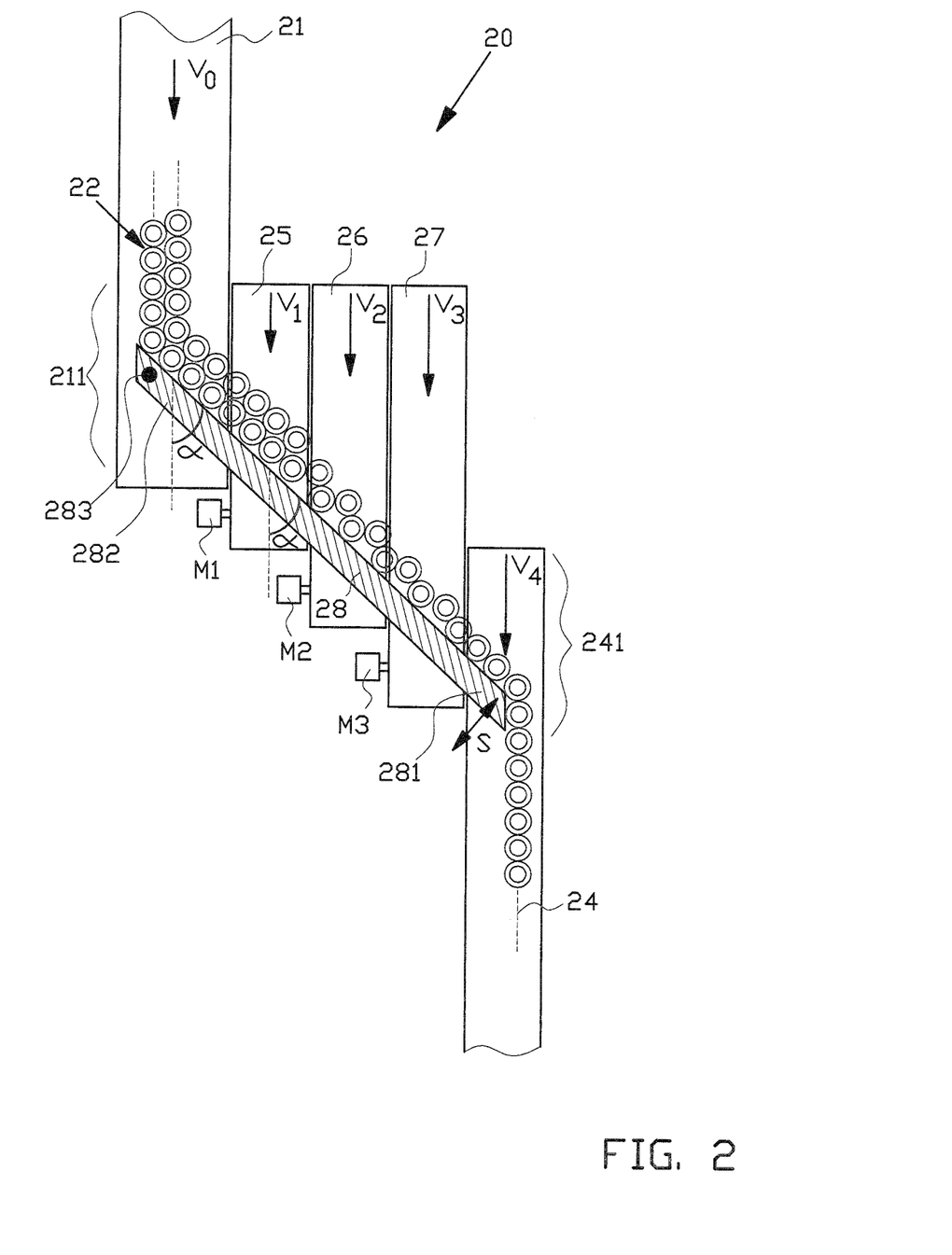
FIG. 2 illustrates a plan view of a first exemplary embodiment of a conveying system according to the invention.

With reference to FIG. 2 a conveying system 20 for conveying vials between functions, for example, between a freeze dryer and a capping station, comprises an in-feed conveyor 21 for conveying a multi row stream of vials 22 in the direction indicated by the arrow at a speed V0. Whilst two rows 22 are shown in FIG. 2, the vials may be arranged on the in-feed conveyor 21 in a plurality of rows, for example up to ten rows of vials. Whilst one in-feed conveyor 21 is shown in FIG. 2, the system 20 may comprise more than one in-feed conveyor 22.

The system shown in FIG. 2 also comprises an out-feed conveyor 24 for moving in the direction indicated by the arrow at a speed V4. The moving directions from the in-feed conveyor 21 and the out-feed conveyor 24 in this first exemplary embodiment are substantially parallel. However, the in-feed conveyor 21 and out-feed conveyor 24 are offset with respect to each other in order to enable the placing of a single liner system between the in-feed conveyor 21 and the out-feed conveyor 24. The conveying surfaces of the in-feed conveyor 21 and the out-feed conveyor 24 are substantially placed in the same plane. In this same plane a series of co-planar conveyor belts 25, 26, 27 are placed side-by-side for defining a conveying surface of said single liner system. Said conveyor belts 25, 26, 27 are movable in substantially the same driving direction indicated by the arrows, at different velocities V1, V2, V3. The first conveyor belt 25 of this series of conveyor belts, and an end section 211 of said in-feed conveyor 21, are placed side-by-side. Furthermore an onset-part 241 of said out-feed conveyor 24 and said last belt 27 of said series of conveyor belts are placed side-by-side.

Although the conveyor belts 25, 26, 27 of said series of conveyor belts may have the same length, for example the same length as conveyor belt 27, the conveyor belts 25, 26, 27 of the exemplary embodiment all have a different length, such that the first conveyor belt 25 is the shortest and that the length of each subsequent conveyor belt towards the end conveyor belt 27 increases. An advantage of this embodiment is that the end sections of the conveyor belts 25, 26, 27 can be placed in a stepped configuration to extend further than the previous neighbouring conveyor belt. In this case the end roll of each conveyor belt 25, 26, 27 can be connected to a driving motor M1, M2, M3 respectively.

In use said driving motors M1, M2, M3 may be driven in order to arrange the various velocities of the conveyor belts such that $$V0=V1<V2<V3=V4$$

to provide a substantial smooth transition of the vials from the in-feed conveyor to the series of co-planar conveyor belts, and from the series of co-planar conveyor belts to the out-feed conveyor.

Over said conveying surface defined by the series of conveyor belts 25, 26, 27, a track guide 28 is placed for guiding said vials from said in-feed conveyor 21 to said out-feed conveyor 24. The guiding surface of said track guide is arranged at an acute angle a with respect to said driving directions V0, V1, V2, V3 and V4.

Since the track guide 28 also extends over said in-feed conveyor 21, said track guide 28 will guide the multi row of vials 22 from said in-feed conveyor 21 towards said single liner system comprising said series of conveyor belts 25, 26, 27. A special transfer device as disclosed in WO 2006/043020 can be omitted in the conveying system according this exemplary embodiment.

Preferably said track guide 28 has a height which is substantially equal to the height of the outermost circumferential surface of said vials 22. This will provide adequate support for said vials to be guided along said track guide 28.

In order to adjust the position of the single row of vials on the out-feed conveyor 24, the position of a downstream end 281 of the track guide 28 is adjustable with respect to said out-feed conveyor 24. In this exemplary embodiment, the track guide 28 is at an upstream end 282 provided by a fixed pivot point 283 which is fixed in position with respect to the conveying system, in particular with respect to said in-feed conveyor 21. The track guide 28 can pivot around said pivot point 283 as indicated with the arrow S. By adjusting the angle a in this way, the position of the downstream end 281 of the track guide 28 can be adjusted for proper positioning of the single row of vials 22 on said out-feed conveyor 24.

The guide surface on said track guide may be provided with a low friction material admitting the vials to slide along said track guide 28.

Preferably the surfaces of said series of co-planar conveyor belts 25, 26, 27 exert low frictional force on the underside of the vials 22. In this way the surface of the conveyor belts 25, 26, 27 can slide underneath the vials 22 and thereby reducing the likelihood of the vials toppling as they are pushed against the track guide 18 or against other vials 22.

Figure 3:
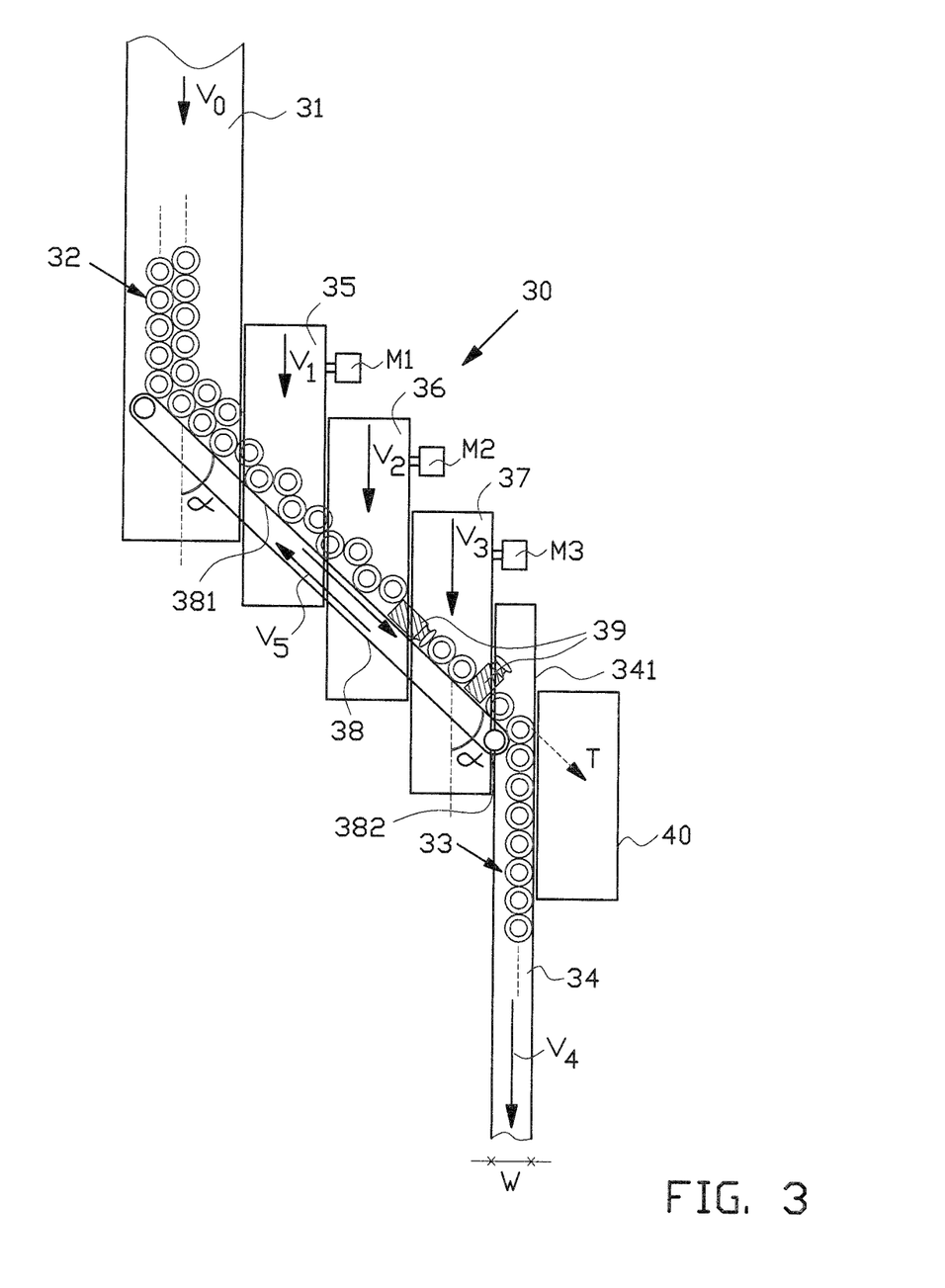
FIG. 3 illustrates a plan view of a second exemplary embodiment of a conveying system according to the invention.

A second exemplary embodiment is shown in FIG. 3. This embodiment also comprises an in-feed conveyor 31 for conveying a multi row stream of vials 32 and an out-feed conveyor 34 for conveying a single row of vials 33, in a configuration which is similar to the configuration of the first exemplary embodiment in FIG. 2. Between the in-feed conveyor 31 and the out-feed conveyor 34 a series of co-planar conveyor belts 35, 36, 37 are placed side-by-side for defining the conveying surface. In this exemplary embodiment, the series of conveyor belts 35, 36, 37 comprise conveyor belts of the same length which are movable at different velocities and which are placed side-by-side in a stepped configuration, such that they define an oblique path between said in-feed conveyor 31 and said out-feed conveyor 34. An advantage of this exemplary embodiment is that for the series of co-planar conveyor belts, substantially one and the same type of conveyor belt 35, 36, 37 can be used. In this way the number of conveyor belts in the series of co-planar conveyor belts, can easily be adjusted by adding or removing conveyor belts.

Again the conveying system according to this second exemplary embodiment comprises a track guide 38 which is placed above said conveying surface for guiding the vials 32 from said in-feed conveyor 31 to said out-feed conveyor 34 along the guiding direction. The track guide of this second exemplary embodiment comprises a guiding belt 38 having a guiding surface 381 which is arranged oblique relative to said in-feed conveyor 31, said out-feed conveyor 34 and said series of conveyor belts 35, 36, 37 of the single liner system. In this embodiment the surface 381 is at an angle a with respect to the moving direction of said conveyors. The guide belt 38 moves at a constant speed V5 for providing a moving guide surface for transferring the vials 32 from the in-feed conveyor 31 to the out-feed conveyor 34. With this embodiment the speed of the vials 32 as they move through the conveying system can be accurately controlled.

In an embodiment the speed of the guiding surface 381 of said guiding belt 38 is substantially equal to the velocity of said out-feed conveyor 34. This can reduce the likelihood of the vials toppling as they are transferred onto the out-feed conveyor 34. The functionality of this second embodiment for arranging a multi-row stream of vials 32 into a single row 33 on said out-feed conveyor 34 is comparable with the functionality of the previous exemplary embodiment as shown in FIG. 2.

In use said driving motors M1, M2, M3 may be driven in order to arrange the various velocities of the conveyor belts such that $$V0<V1<V2<V3<V4$$

The transition from the in-feed conveyor to the first belt can already be used to start increasing the spacing between the vials for allowing them to adopt a single row formation. Furthermore, the transition from the last belt to the out-feed conveyor can be used to further increase the spacing between the vials for arranging a single row formation Although measures have been taken to reduce greatly the likelihood of the vials 32 toppling as they are conveyed by the conveying system, there always will be some vials which are non-upright or are not aligned properly. It is preferred to remove these vials 39 from the single row 33 of vials in order to prevent problems in the subsequent arranged production step. The misaligned or non-upright articles 39 are also conveyed through the system, in the same way as the upright vials. That is, they are moved along said track guide 38 in the guide direction, until they reach the downstream end 382 of said guiding belt 38. At this point the upright vials are moved onto the out-feed conveyor 34 which preferably comprises a rigid surface in order to prevent the upright vials from slipping over the edge 341 of the out-feed conveyor 34. However, the non-upright vials 39 may roll over said rigid surface for example along an expel trajectory T for expelling the non-upright vials 39 as they move over the edge 341 into a disposal container 30 which is placed next to the out-feed conveyor 34 near the position where the downstream end 382 of the track guide 38 reaches the out-feed conveyor 34.

Furthermore the single row of vials 33 is placed near the edge 341 of the out-feed conveyor 34 such that any misaligned or non-upright articles are moved to a position at least partially extending over said edge 341. These vials will then topple over said edge 341 into said container 40.

Furthermore the width W of said out-feed conveyor 34 is chosen such that only one single line of upright articles 33 can be conveyed. Any misaligned or non-upright article will topple down from this narrow out-feed conveyor 34.

Figure 4:
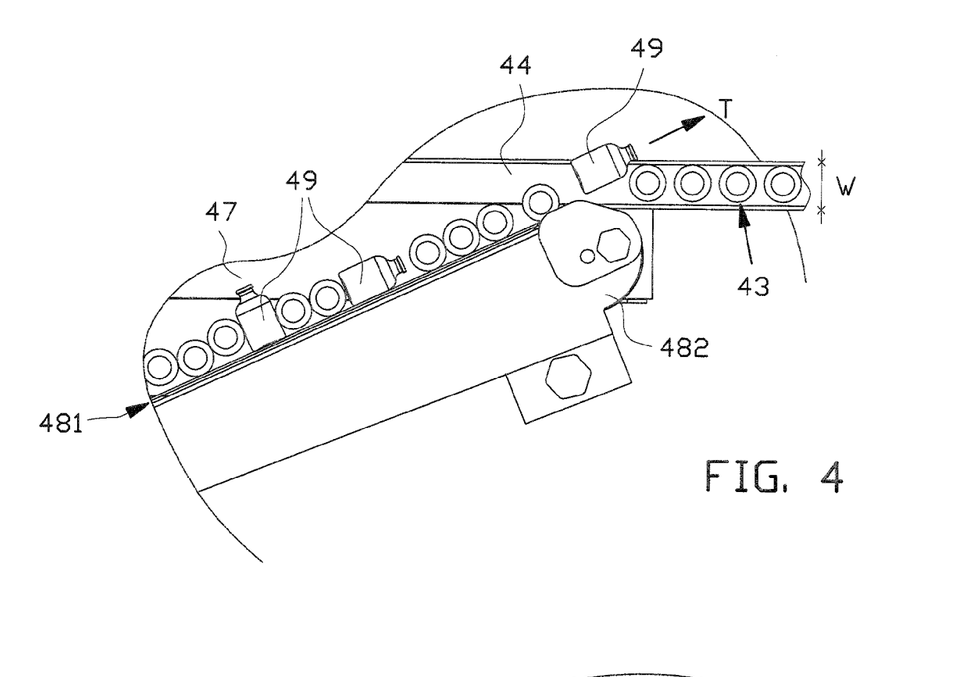
FIG. 4 illustrates en exemplary embodiment where fallen vials are removed from the system.

In a further embodiment, as shown in detail in FIG. 4, the width W of the out-feed conveyor 44 is approximately equal to the width of the vials 43.

Figure 5:
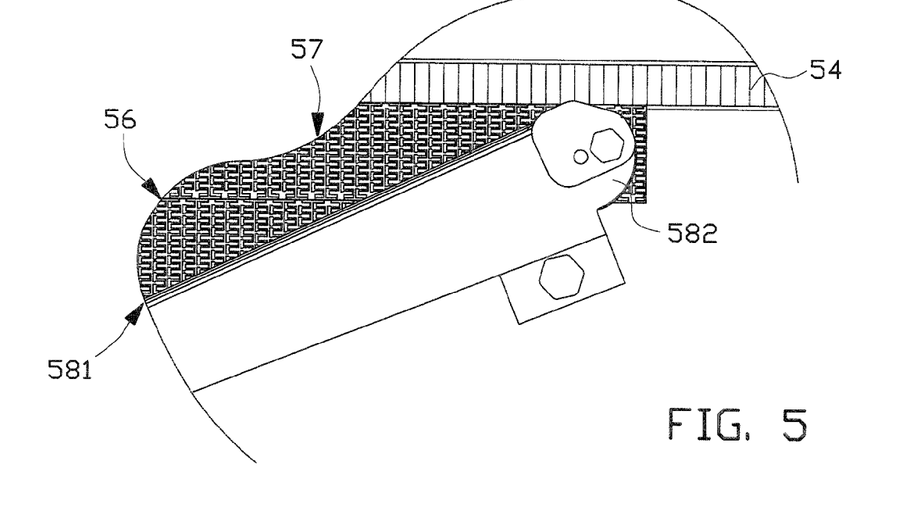
FIG. 5 illustrates a detail of a conveyor belt according to a third exemplary embodiment.

In a further embodiment, as shown in FIG. 5, the conveyor belts of said series of co-planar conveyor belts, comprises a non-even surface, for example a rough surface or a surface with cavities or holes. In the exemplary embodiment, as shown in FIG. 5, the conveyor belts 57 comprises plastic modular conveyor belts made up of interconnected modules providing a conveying surface with a plurality of holes in said surface. Furthermore, FIG. 5 illustrates the use of conveyor belts 57 having a non-even surface, in combination with an out-feed conveyor 54 having a small width, which comprises a rigid surface.

Figure 6A:
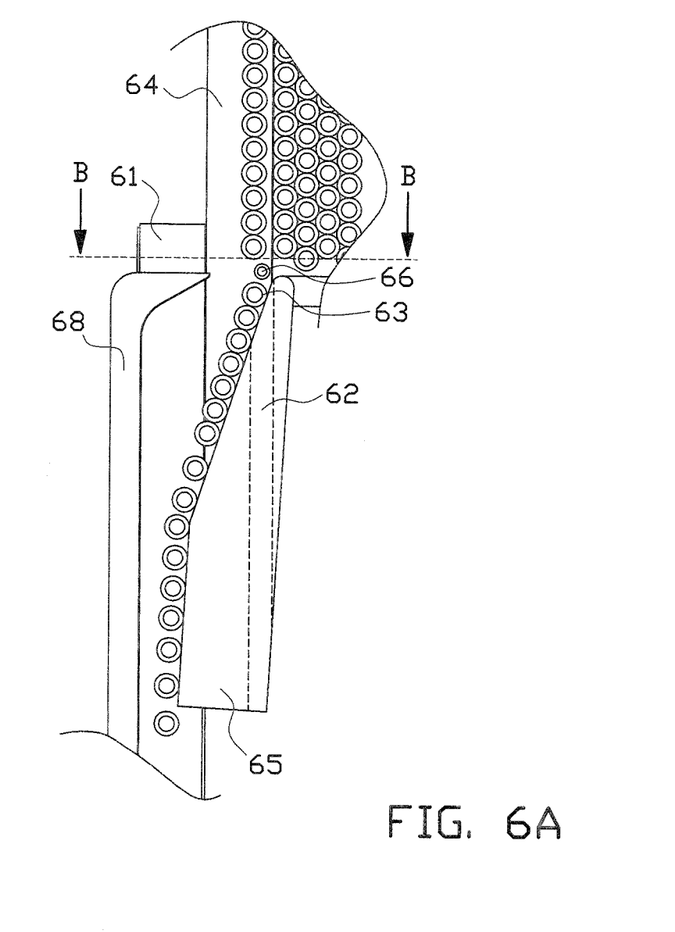
FIGS. 6A and 6B, illustrate an exemplary embodiment of an in-feed track guide allowing the passage of loose stoppers.
Figure 6B:
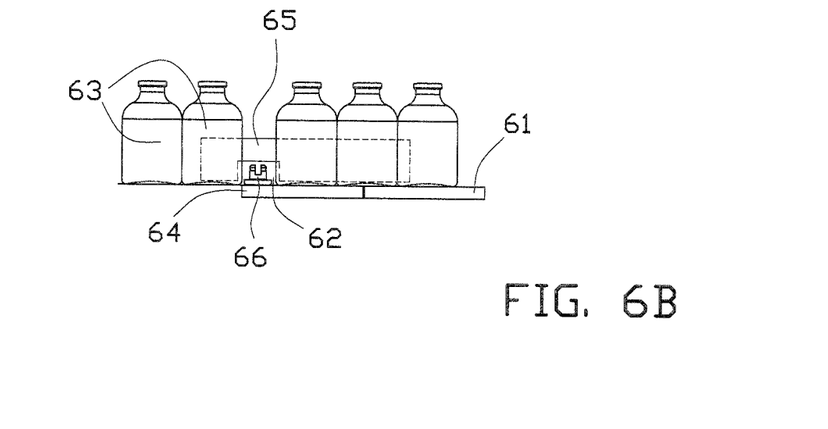

FIGS. 6A and 6B show an exemplary embodiment in which the conveyor system is adapted to allow loose stoppers 66 to be removed form the conveyor system. In FIG. 6A the loose stopper 66 is carried along the conveyor belt 64 and contacts track guide 65, which guides the vials 63 onto the in-feed conveyor 61. The loose stopper 66 will be conveyed along the conveyor system together with any vials 63. In FIG. 6A, in a row of vials 63 there is present a loose stopper 66. the vials 63 and the loose stopper 66 are moved along the conveyor system by the movement of the conveyor belt 64 and contact the track guide 65. The loose stopper 66 will move along the track guide 65 until it reaches aperture 62. Due to the relative movement of the conveyor belt 64 and the track guide 65, the loose stopper 66 will pass through the aperture 62 and exit the conveyor system. The vials 63 being larger than the aperture 62 do not pass through the aperture 62 and continue along the conveyor system, onto the in-feed conveyor 61.

When a conveyor belt 64 is placed between the process chamber an the in-feed conveyor 61, as shown for example in FIGS. 1 and 6, the velocity of the in-feed conveyor 61 may be chosen to be larger than the velocity of the conveyor belt 64. Such a difference in velocity serves to separate out the vials as they are conveyed from the conveyor belt 64 onto said in-feed conveyor 61.

It is to be understood that the above description is intended to illustrate the operation of the preferred embodiments and is not meant to limit the scope of the invention. From the above discussion, many variations will be apparent to one skilled in the art that would yet be encompassed by the spirit a scope of the present invention. For example the first exemplary embodiment may also be provided with a guiding belt, and/or a container 40. The second exemplary embodiment can also be provided with an adjustable track guide as shown in FIG. 2; The downstream end 382 of the guiding belt 38 may be adjustable for example in the same way as shown in the first exemplary embodiment. And also the conveyor belts of the first exemplary embodiment 25, 26, 27 and/or the second exemplary embodiment 35, 36, 37 may be provided with plastic conveyor belts made up of modules as shown in FIG. 5.

In summary, the invention relates to a conveying system for conveying intended upright articles, for example vials, comprising an in-feed conveyor, an out-feed conveyor, and a single liner system placed between said in-feed conveyor and out-feed conveyor. The single liner system according to the present invention is built up around a set of conveyors/moving belts, each on a different speed and a track guide to guide the articles in a gentle way towards the higher speed, where downstream the speed of said conveyors is increasing. The last conveyor is at highest speed. Such a series of co-planar conveyor belts, wherein said belts are placed side-by-side, provides a single liner system with a limited or small width that can be implemented for instance in barrier isolations. The conveying system according to the invention provides a high speed single liner system which provides several advantages over the conventional single liner systems, such as the simplicity and size.

What is claimed is:

1. Conveying system for conveying intended upright articles comprising:
   an in-feed conveyor, an out-feed conveyor, and
   a single liner system placed between said in-feed conveyor and out-feed conveyor,
   wherein said single liner system comprises:
      a series of co-planar conveyor belts, wherein said belts are placed side by side to define a conveying surface and wherein said belts are movable in substantially the same driving direction at different velocities;
      a track guide placed above said conveying surface for guiding said articles from said in-feed conveyor to said out-feed conveyor along a guide direction, wherein said guide direction is arranged at an acute angle with respect to said driving direction; wherein said velocity of subsequent belts of said series of co-planar conveyor belts increases in the guide direction, wherein the track guide comprises one or more apertures for expelling fallen articles.

2. Conveying system according to claim 1, wherein an upstream end of said track guide extends at least partially over said in-feed conveyor and wherein a downstream end of said track guide extends at least partially over said out-feed conveyor to place said articles near an edge of said out-feed conveyor.

3. Conveying system according to claim 1, wherein the position of said downstream end of said track guide with respect to said out-feed conveyor is adjustable, in particular for adjusting said position of said downstream end with respect of said edge of said out-feed conveyor.

4. Conveying system according to claim 1, wherein said acute angle between said guide direction and said driving direction is adjustable.

5. Conveying system according to claim 1, wherein said track guide is pivotable mounted on said in-feed conveyor to adjust said acute angle.

6. Conveying system according to claim 5, wherein a pivot is provided at an upstream end of said track guide.

7. Conveying system according to claim 1, wherein a first belt of the series of conveyor belts that is adjacent to said in-feed conveyor is co-planar with said in-feed conveyor.

8. Conveying system according to claim 7, wherein an end-part of said in-feed conveyor is placed side by side with said first belt.

9. Conveying system according to claim 7, wherein the velocity of said first belt is equal to or higher than the velocity of said in-feed conveyor.

10. Conveying system according to claim 1, wherein a last belt of the series of conveyor belts that is adjacent to said out-feed conveyor is co-planar with said out-feed conveyor.

11. Conveying system according to claim 10, wherein an onset-part of said out-feed conveyor is placed side by side with said last belt.

12. Conveying system according to claim 1, wherein said out-feed conveyor and/or said track guide are arranged with respect to each other in order to expel any misaligned or non-upright articles.

13. Conveying system according to claim 1, wherein the track guide is placed at a distance above the conveying surface of the series of co-planar conveyor belts, wherein an opening between an underside of the track guide an the conveying surface is larger than the dimensions of fallen articles but smaller than the dimensions of the upright articles.

14. Conveying system according to claim 1, wherein the track guide and the out-feed conveyor are arranged for providing an expel trajectory which runs over an edge of said out-feed conveyor, wherein said expel trajectory extends from said down-stream end of said track guide and preferably substantially in line with said guide direction.

15. Conveying system according to claim 1, wherein said track guide and said out-feed conveyor are arranged to convey a single line of articles on the out-feed conveyor.

16. Conveying system according to claim 1, wherein the width of said out-feed conveyor is larger than the width of a bottom surface of said articles, and preferably is smaller than twice the width of said bottom surface or smaller than the height of said articles.

17. Conveying system according to claim 1, wherein the velocity of said out-feed conveyor is equal or higher than the velocity of said last belt.

18. Conveying system according to claim 1, wherein the track guide comprises a guiding surface that is substantially orthogonal to the conveying surface.

19. Conveying system according to claim 1, wherein the track guide comprises a guiding belt.

20. Conveying system according to claim 19, wherein the velocity of said guiding belt is substantially equal to or higher than the velocity of said in-feed conveyor.

21. Conveying system according to claim 1, wherein said intended upright articles are vials.

22. Assembly for processing a stream of intended upright articles, said assembly comprising a process chamber, comprising an unloading device to remove the articles from the chamber in a multi-row stream, wherein the assembly further comprises a conveying system for conveying intended upright articles comprising an in-feed conveyor, an out-feed conveyor, and a single liner system placed between said in-feed conveyor and out-feed conveyor, wherein said single liner system comprises a series of co-planar conveyor belts, said belts are placed side by side to define a conveying surface and movable in substantially the same driving direction at different velocities; a track guide placed above said conveying surface for guiding said articles from said in-feed conveyor to said out-feed conveyor along a guide direction, said guide direction is arranged at an acute angle with respect to said driving direction; said velocity of subsequent belts of said series of co-planar conveyor belts increases in the guide direction; wherein said unloading device is synchronized with the in-feed conveyor of the conveying system, and comprises pushing mechanism for pushing said articles out of said chamber, the speed of said pushing mechanism is adapted to supply the articles to the in-feed conveyor in multiple rows, preferably less than five rows, more preferably two to three rows and wherein said out-feed conveyor and/or said track guide are arranged in order to expel any misaligned or non-upright articles.

23. Assembly according to claim 22, wherein said acute angle between said guide direction and said driving direction is adjustable.

24. Assembly according to claim 22, wherein said track guide of said conveying system is pivotable mounted on said in-feed conveyor.

25. Assembly according to claim 22, wherein said track guide of said conveying system comprise a guiding belt.

26. Assembly according to claim 22, wherein said track guide of said conveying system comprises a guiding surface that is substantially orthogonal to said conveying surface.

27. Assembly according to claim 22, wherein said process chamber is a freeze dryer or a sterilizing tunnel.

28. Assembly according to claim 22, wherein said intended upright articles are vials.

\* \* \* \* \*